(12) United States Patent
Palekar et al.

(10) Patent No.: US 6,475,350 B2
(45) Date of Patent: *Nov. 5, 2002

(54) METHOD FOR REMOVING NOX AND OTHER POLLUTANTS FROM GAS STREAMS USING A PLASMA ASSISTED CATALYST

(75) Inventors: Vishwesh Palekar, Irvine, CA (US); Ralph J. Slone, Columbus, IN (US)

(73) Assignee: Noxtech Inc, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,347

(22) Filed: Jul. 18, 1997

(65) Prior Publication Data

US 2001/0001435 A1 May 24, 2001

(51) Int. Cl.⁷ .................................................. B01J 19/08
(52) U.S. Cl. ........................ 204/164; 204/177; 588/247
(58) Field of Search ................................ 204/164, 177; 422/186.04, 907; 588/247

(56) References Cited

U.S. PATENT DOCUMENTS

| 5,240,575 A | * | 8/1993 | Mathur et al. ............... 204/177 |
| 5,433,832 A | * | 7/1995 | Rich et al. .................. 204/164 |
| 5,609,736 A | * | 3/1997 | Yamamoto ................... 204/164 |
| 5,695,619 A | * | 12/1997 | Williamson et al. ......... 204/177 |
| 5,746,984 A | * | 5/1998 | Hoard ......................... 204/164 |
| 5,807,466 A | * | 9/1998 | Wang et al. ................. 204/177 |
| 5,914,015 A | * | 6/1999 | Barlow et al. .............. 204/177 |

FOREIGN PATENT DOCUMENTS

EP 578863 * 1/1997

* cited by examiner

Primary Examiner—Kishor Mayekar
(74) Attorney, Agent, or Firm—Loudermilk & Associates

(57) ABSTRACT

An apparatus and a method for removing pollutants from gas streams using a reactor assembly. The reactor assembly includes an inlet, an outlet, at least two electrodes, a catalyst bed, and plasma generated from the electrodes. Electrical energy is applied, and catalytic surfaces enhanced by the plasma results in the reduction of NOx to $N_2$ and oxidation of particulates and hydrocarbons to $CO_2$. Furthermore, the present invention removes NOx, particulate, and hydrocarbons from $O_2$ rich pollutant streams without the need for supplemental additives.

21 Claims, 5 Drawing Sheets

METHOD FOR REMOVING NOX AND OTHER POLLUTANTS FROM GAS STREAMS USING A PLASMA ASSISTED CATALYST

FIELD OF THE INVENTION

The present invention relates to the removal of pollutants from gases, and more particularly to the removal of nitrogen oxides, such as NO and $NO_2$, and other pollutants including particulates from exhaust gases or other industrial gases such as produced by internal combustion engines using a plasma-assisted catalytic surface, and to industrial processes generating such gases.

BACKGROUND OF THE INVENTION

Carbonaceous fuels are burned in internal combustion engines and other equipment, including boilers, furnaces, heaters, incinerators, and the like (i.e., in a wide variety of industrial processes). Excess air frequently is used to complete the oxidation of combustion byproducts such as carbon monoxide (CO), hydrocarbons, and soot. High temperature combustion using excess air, however, tends to generate nitrogen oxides (often referred to as NOx). In addition, a number of fossil fuel combustion sources result in polluted exhaust streams. These sources include internal combustion engines such as diesel, natural gas, and lean burn gasoline as well as external combustion sources such as boilers, incinerators, and other NOx, particulate and hydrocarbon containing streams. The polluted exhaust streams from such sources also may contain high $O_2$ (0–18%) levels. Reducing NOx can be particularly difficult for such gases containing high $O_2$ levels.

Emissions of NOx include nitric oxide (NO) and nitrogen dioxide ($NO_2$). During combustion, it is believed that free radicals of nitrogen ($N_2$) and oxygen ($O_2$) combine chemically primarily to form NO at high temperatures. Mobile and stationary combustion equipment are concentrated sources of NOx emissions. If discharged to the environment, NO emissions oxidize to form $NO_2$, which tends to accumulate excessively in many urban areas. In sunlight, the $NO_2$ reacts with volatile organic compounds to form ground level ozone, eye irritants, and photochemical smog. These adverse effects have prompted extensive efforts for controlling NOx emissions. Despite advancements in fuel and combustion technology, ground level ozone concentrations still exceed federal guidelines in many urban areas. Under the Clean Air Act and its amendments, these ozone nonattainment areas must implement strategies for low NOx, which can only be attained by exhaust aftertreatment.

Exhaust aftertreatment techniques tend to remove NOx using various chemical or catalytic methods. Such methods are known in the art and typically involve either reduction to $N_2$ or oxidation to $NO_2$ and subsequently to $HNO_3$. The former reduction processes generally involve either nonselective catalytic reduction (NSCR), selective catalytic reduction (SCR) or selective noncatalytic reduction (SNCR). Alternatively, NO may be oxidized to $NO_2$ for removal by wet scrubbers. Such aftertreatment methods typically require some type of additional reactant to remove the NOx emissions. The use of these reactants often results in safety problems in addition to the added cost of the reactant. It would be more desirable to utilize reduction as opposed to oxidation because reduction of NO results in benign $N_2$, while oxidation or NO results in $NO_2$. Furthermore, it would be desirable to achieve reduction of NO to $N_2$ without the use of additional reactants or additives.

Although a number of different catalytic and non-catalytic postcombustion technologies have been used for NO removal, none have been able to convert NO to $N_2$ to an acceptable degree in the presence of large amounts of $O_2$ and/or $H_2O$. Additives such as nitrogen based chemicals ($NH_3$) and hydrocarbons also have been used to yield NOx reduction to $N_2$, but such techniques tend to result in higher cost and are undesirable as they tend to present storage, safety, and by-product slippage problems.

Conventional catalytic technologies for the selective removal of NOx tend to operate at temperatures between 600–1000° F. and require the use of additives such as $NH_3$ (toxic) or hydrocarbons, often with undesirable by-products and safety concerns. Non-catalytic technologies tend to require much higher temperatures (above 1300° F.), requiring accessory equipment to increase its temperature and needing toxic additives such as $NH_3$.

The use of non-thermal plasmas for NOx and particulate removal at low temperatures is described in the literature. Without being bound by theory, a non-thermal plasma consists of high energy electrons that are highly reactive, but thermally cool (hence "non-thermal"). It is believed that these reactive electrons collide with the primary components of the polluted gas stream to form the active species in-situ, which in turn may remove NOx and particulate emissions.

Attempts to remove NOx from exhaust gases using various types of plasma reactors has been explored. A variety of reactors, which differ primarily in the mode of generating electrons through an electrical discharge, have been used for NOx removal. These include the following: (1) corona (DC or pulsed); (2) dielectric barrier discharge; and (3) dielectric packed bed reactor. In general, the polluted gas stream is passed through each of the reactors in which a non-thermal plasma is generated, leading to the in-situ formation of the desired active species. In the presence of $O_2$ (as in typical diesel exhaust), studies conducted to date using these discharge reactors for NOx removal have reported the oxidation of NO to $NO_2$ with very poor selectivity to the desired species, $N_2$.

Mathur et al. (U.S. Pat. Nos. 5,240,575 and 5,147,516) and Breault et al. (U.S. Pat. No. 5,458,748) have discussed using a corona as well as a "catalyzed" corona reactor to treat simulated exhaust. The general thrust of such disclosures is that NO is primarily removed by oxidation to $NO_2$ in the presence of $O_2$, with subsequent absorption as $HNO_3$. A number of prior art studies referenced in Mathur and Breault also describe the removal of NO by oxidation to $NO_2$. Other studies, such as Penetrante et al. (*NOx Reduction by Compact Electron Beam Processing*, Proceedings of the 1995 Diesel Engine Emissions Reduction Workshop, University of California, San Diego, Jul. 24–27, 1995, p. IV75–85), Wallman et al. (*Nonthermal Aftertreatment of Diesel Engine Exhaust*, Proceedings of the 1995 Diesel Engine Emissions Reduction Workshop, University of California, San Diego, Jul. 24–27, 1995, p. V33–39), Civitano et al. (*Flue Gas Simultaneous DeNOx/DeSOx by Impulse Corona Energization,* 3rd International Conference on Electrical Processing, 1987), Mizuno et al. (*Application of Corona Technology in the Reduction of Greenhouse Gases and Other Gaseous Pollutants.*, Non-Thermal Plasma Techniques for Pollution Control-Part B: Electron Beam and Electrical Discharge Processing, (Edited by B. M. Penetrante and S. E. Schultheis), Springer-Verlag, Heidelberg, 1993), and Fujii et al. (*Simultaneous Removal of NOx, COx, SOx and Soot in Diesel Engine Exhaust.*, Non-Thermal Plasma Techniques for Pollution Control-Part B: Electron Beam and Electrical Discharge, (Edited by B. M. Penetrante and S. E. Schultheis), Springer-Verlag, Heidelberg, 1993, 257–279), which used a diesel film present the shift in the NO removal to $NO_2$ instead of the desired product $N_2$, with the introduction of less than 2% $O_2$ in the feed gas.

Similarly, Gentile et al. (*Microstreamer Initiated Advection in Dielectric Barrier Discharges for Plasma Remediation of NxOy: Single and Multiple Streamers*, Proceedings of the 1995 Diesel Engine Emissions Reduction Workshop, University of California, San Diego, Jul. 24–27, 1995, p. V45–56, and *Microstreamer Dynamics During Plasma Remediation of NO using Atmospheric Pressure Dielectric Barrier Discharges: Single and Multiple Streamers*, Proceedings of the Eight ONR Propulsion Meeting, San Diego, Calif., 1995, p. 64–69) used a dielectric barrier discharge, resulting in NO removal by oxidation to $NO_2$.

The average kinetic energy of the electrons in a conventional gas phase plasma discharge (such as described in the above studies) is less than 10 eV. Under such conditions, and in the presence of high $O_2$ concentrations (e.g., 2–18%), Penetrante has shown that $O_2$ is preferentially dissociated compared to $N_2$, resulting in a low selectivity to $N_2$; the predominant pathway being the undesired conversion of NO to $NO_2$ and further to $HNO_3$.

Bayliss et al.(U. S. Patent No. 5,440,876) and Fanick et al. (*Reduction of Diesel NOx/Particulate Emissions using a Non-thermal Plasma*, Proceedings of the 1995 Diesel Engine Emissions Reduction Workshop, University of California, San Diego, Jul. 24–27, 1995, p. V57–67) describe a gas purification device which uses a high dielectric ferroelectric material packed between two electrodes to demonstrate oxidation of particulates to $CO_2$ in diesel exhaust. Though not clearly mentioned, this particulate trap also results in NO oxidation to $NO_2$. The pellets are listed to be preferentially Pb or Ba niobate, titanate, or zirconate. Thus, the prior art literature does not provide a method for the selective reduction of NOx to $N_2$ without the use of additives, in the presence of high $O_2$ concentrations.

Other studies describe the use of additives such as hydrocarbons and $NH_3$ to achieve NOx reduction to $N_2$. Vogtlin et al. (*Pulsed Corona Discharge for Removal of NOx from Flue Gas.*, Non-Thermal Plasma Techniques for Pollution Control-Part B: Electron Beam and Electrical Discharge, (Edited by B. M. Penetrante and S. E. Schultheis), Springer-Verlag, Heidelberg, 1993, 187–198) and Chess et al. (*Plasma versus Thermal Effects in Flue Gas NOx Reduction Using Ammonia Radical Injection*, J. Air & Waste Manage. Assoc., 45, 627–632) describe the use of hydrocarbons and $NH_3$ respectively, but these require supplemental equipment often resulting in safety, storage, and by-product slippage concerns. Using additives is clearly costly, inconvenient, and commercially impractical for NOx removal.

Despite such extensive prior art activities, a need remains for systems and methods of selectively reducing NOx to $N_2$ and oxidation of particulates and hydrocarbons to $CO_2$ in $O_2$-containing polluted streams without the use of supplemental reactants or additives.

SUMMARY OF THE INVENTION

The present description provides methods and systems for removing NOx, particulates, and hydrocarbons from $O_2$ rich pollutant streams, using a non-thermal plasma generated between two electrodes with a catalytic packing between the electrodes. The combination of a plasma and the catalytic packing selectively catalyzes and enhances the reduction of NOx to $N_2$ and oxidation of particulates and hydrocarbons to $CO_2$.

The present invention utilizes desirable combinations of materials and plasma to selectively and catalytically reduce NOx to $N_2$, without supplemental additives. Preferably, the desired catalytic materials, as more described herein, consist of materials such as metal promoted or unpromoted solid oxide catalysts having properties to scavenge oxygen and/or to otherwise result resulting in preferential and selective NOx reduction. Also, preferably, when the desired plasma is combined with the desired materials, this combination results in and drives the selective NOx reduction process. In certain preferred embodiments, the catalyst is desirably formed in a monolithic or honeycomb manner, and, in certain internal combustion engine-related embodiments, it is constructed to operate while consuming minimal engine power, while reducing NOx to a desirable level.

Accordingly, it is an object of the present invention to provide an apparatus and a method for selectively removing NOx, particulate, and hydrocarbons from $O_2$ rich pollutant streams, including without the need for supplemental additives.

It is a further object of the present invention to provide an apparatus and a method for removing NOx, particulate, and hydrocarbon by using a non-thermal plasma generated between two electrodes with a catalytic packing between the electrodes.

It is another object of the present invention to provide an apparatus and a method in which the catalytic packing selectively catalyzes the reduction of NOx to $N_2$ and oxidation of particulates and hydrocarbons to $CO_2$.

Finally, it is an object of the present invention to provide an apparatus and a method that may be practically applied to a variety of combustion and effluent gas sources, including internal combustion engines, burners, boilers, and other combustion and industrial processes.

BRIEF DESCRIPTION OF THE DRAWINGS

The preferred embodiments of the present invention will now be described more specifically with reference to the attached drawings, wherein.

DETAILED DESCRIPTION OF THE PREFERRED EMBODIMENTS

Reference will now be made in greater detail to certain preferred embodiments of the present invention, examples of which are illustrated in the accompanying drawings.

Figure 1A:
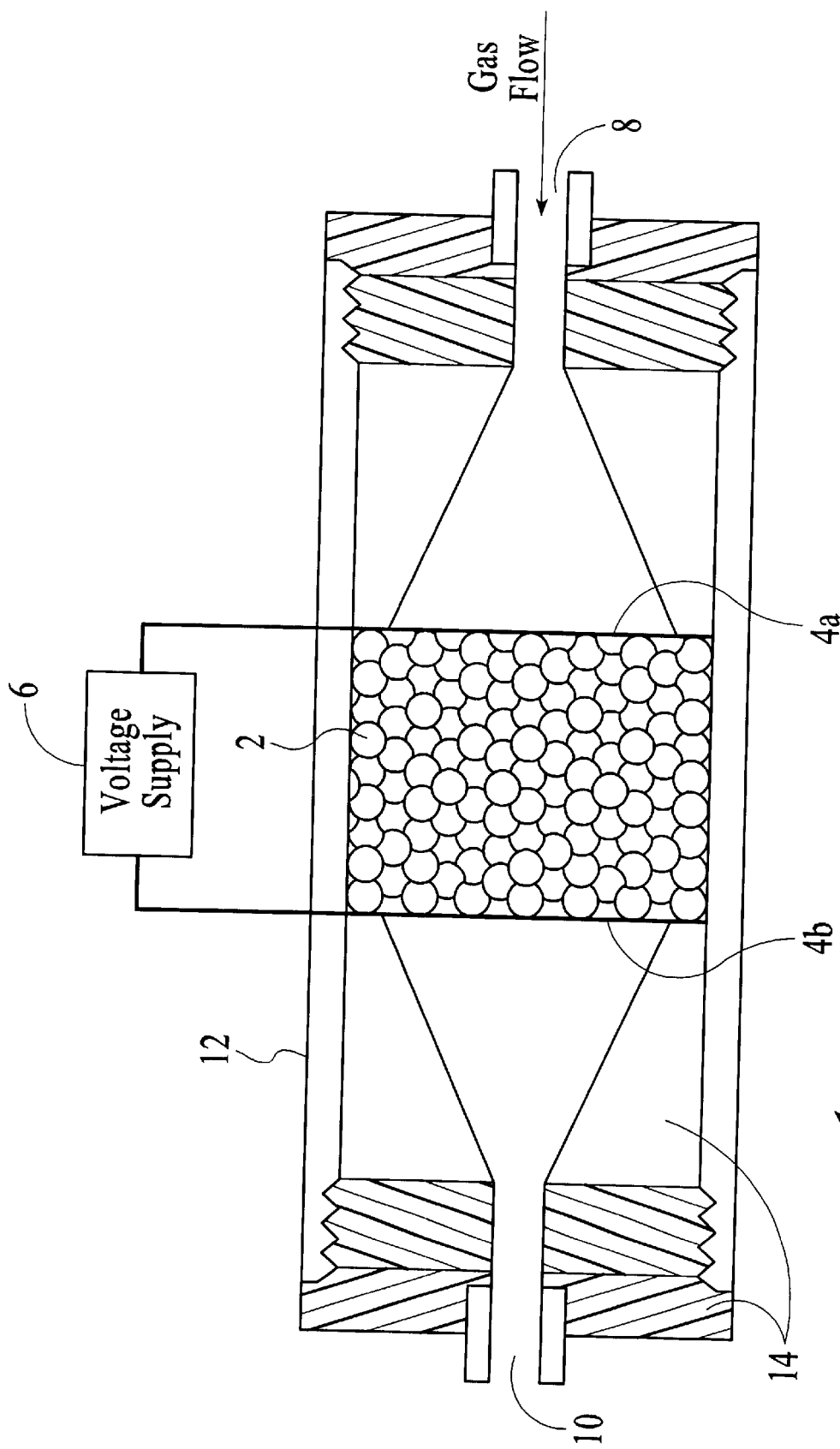
FIGS. 1A to 1C are diagrams illustrating certain exemplary preferred embodiments of the present invention.

FIG. 1A illustrates an exemplary preferred embodiment of the present invention. As illustrated in the embodiment of FIG. 1A, in accordance with the present invention, reactor assembly 1 is configured so that exhaust gases from an internal combustion engine or other combustion or industrial source are channeled into inlet 8. From inlet 8, the gases flow through electrode 4a and into catalyst bed 2, within which desirable reactions occur, as more fully described herein. After passing through and around the material presented by catalyst bed 2, the exhaust gases pass through electrode 4b and out of outlet 10. Power source 6 is coupled to electrodes 4a and 4b. Reactor 1 is desirably constructed of an outer housing 12, which may consist of a glass tube or other suitable material (e.g., metal with suitable electrical insulation), and also may include other structural materials, such as members 14, which may consist of insulating material such as Teflon. Members 14 generally serve to position inlet 8 and outlet 10 in a desired generally fixed relationship with respect to electrodes 4a and 4b and catalyst bed 2.

Power source 6 supplies an alternating (sinusoidal), DC or pulsed voltage such that a resultant plasma is surface stabilized and does not result in breakdown of either the gas or the catalytic material. The frequency/repetition rate of the AC supply (or DC pulses, etc.) may vary from 60 Hz to as high as 30,000 Hz, and the DC supply can be designed with controlled rise times of the order of about $10^{-3}$ seconds to $10^{-6}$ seconds with modern switching technology. In certain embodiments, with catalytic surfaces configured and operative with a fast response time, a switching speed of up to $10^{-10}$ may be used. In certain embodiments, power source 6 supplies a 60 Hz, 110 V line voltage to a 30 kV AC transformer, the output of which is supplied to electrodes 4a and 4b via a variac that modulates the voltage supplied to electrodes 4a and 4b. In accordance with the present invention, catalyst bed 2 in combination with the plasma generated due to the electric field may desirably reduce NOx selectively to $N_2$. In certain embodiments, the materials of catalyst bed 2 may be selected to catalyze the oxidation of hydrocarbons, soluble organic matter, and particulates to $CO_2$ to achieve simultaneous NOx reduction selectively to $N_2$ and particulate oxidation to $CO_2$, either in a series arrangement or a dual activity bed.

In certain preferred embodiments, outer housing 12 consists of a glass tube that may be, for example, 5.9 cm in diameter and house a catalyst packed volume of 68 $cm^3$ with a length of 2.5 cm and a diameter of 5.9 cm, with the plasma generated between electrodes 4a and 4b, which preferably are of a mesh construction and designed to allow gas flow through the electrodes. Electrodes 4a and 4b preferably are adjustably positioned and hold materials of catalyst bed 2 in a desired position, with the distance between electrodes 4a and 4b dependent on the length and quantity of the materials in catalyst bed 2. Catalyst bed 2 may utilize catalytic materials curved substantially in the form of spheres (such as about 2–8 mm in diameter), although the size may vary as will be apparent to those skilled in the art, but in other embodiments (such as described herein), monolithic or other catalyst configurations are desirably utilized. The catalyst spheres or monoliths may be arranged between the electrodes in the various embodiments described above such that a high electric field (e.g., kV/cm) is maintained across the catalyst material. The electric field should be above 3 kV/cm, but preferably above 5 kV/cm and more preferably above 10 kV/cm. In addition, the catalyst should be arranged such that the plasma volume is maximized and the current density is as low as possible. A plasma generated over the catalyst surface using a voltage of 20 kV and a current of 0.5 milliamperes, for example, may result in an electric field strength of 8 kV/cm and a current density of 18 amperes/$cm^2$.

Figure 1B:
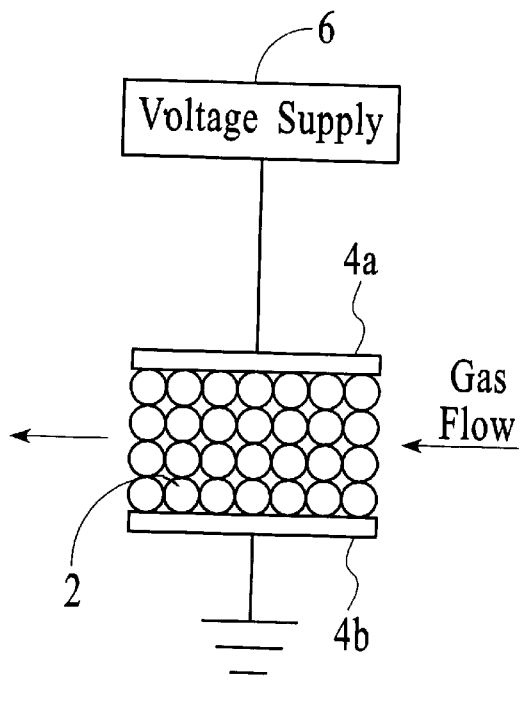
Figure 1C:
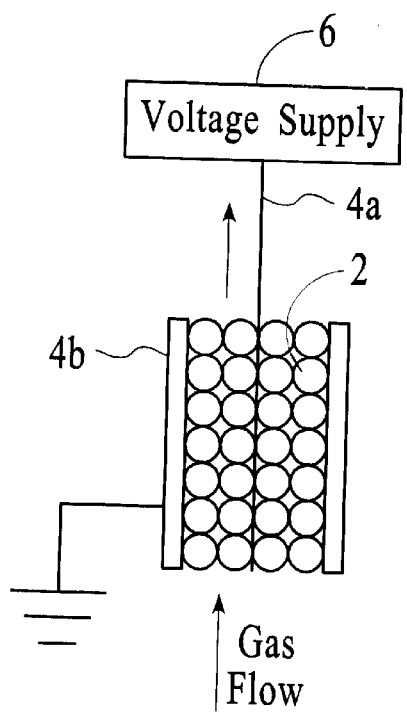

FIGS. 1B and 1C illustrate other electrode configurations that are used in other embodiments of the present invention. For example, as illustrated in FIG. 1B, electrodes 4a and 4b may be arranged transverse to the direction of flow. As illustrated, power source 6 may be configured so as to present a suitable voltage on electrode 4a, with electrode 4b coupled to a ground or reference potential. As an additional example, as illustrated in FIG. 1C, electrodes 4a and 4b may be configured in an annular arrangement, with electrode 4a consisting of a central wire or rod and coupled to power source 6, and with electrode 4b being an annular outer electrode coupled to a ground or reference potential.

Figure 2:
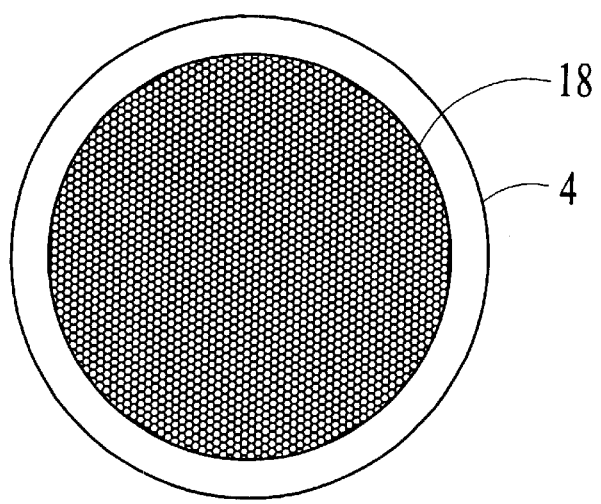
FIG. 2 is a diagram illustrating an exemplary preferred embodiment of a fine electrode mesh that may be used in accordance with the present invention.

FIG. 2 illustrates one example of electrode 4, which may be used for electrodes 4a and 4b , etc. In this preferred embodiment, electrode 4 consists of fine electrode mesh 18, consisting of a conductive material such as aluminum, steel, or porous carbon. In other preferred embodiments, these electrodes could also be configured using materials having a low work function or having a high propensity for electron emission. These materials may consist of borides such as $ZrB_2$, $LaB_6$, $CeB_6$, and/or oxides such as $Gd_2O_3$, $ThO_2$, and $Y_2O_3$, $Sc_2O_3$ and other materials known to those in the art. What is important is that electrodes 4a and 4b are positioned with respect to catalyst bed 2 such that electric fields are generated in a desired manner in and around catalyst bed 2 for desirable reactions.

The following should be noted with respect to the electrical energy utilized to activate catalytic surfaces in accordance with the present invention. In typical gas phase plasma systems, the use of pulsed power systems with fast rise times is considered advantageous from an energy usage standpoint because minimal energy is consumed in heating the gas. In such systems, however, it is believed that the formation of microstreamers is determined by the rate of charging and discharging of the metallic electrodes. Because metals generally are conductors, such rates are extremely rapid; thus, plasma microstreamers may be formed with pulse rise times on the order of nanoseconds.

In accordance with the present invention, and contrary to such conventional thinking, the rate determining step is the rate of charging and discharging a capacitive catalytic material. With materials in accordance with preferred embodiments of the present invention, this rate of charging and discharging may be several orders of magnitude slower than nanosecond pulses. Using a 60 Hz cycle (60 cycles per second, 8.33 milliseconds per half cycle), for example, sufficient time is provided for a large number of microstreamers which serve to enhance desired catalytic activity in accordance with the present invention. In contrast, using extremely fast rise times in accordance with conventional thinking (e.g., nanosecond rise times, etc.), such a rate tends to far exceed the rate of charging and discharging of the dielectric, which is responsible for plasma current. Hence, when a dielectric material is used with such fast rise time systems, it is believed that very few microstreamers are formed, resulting in a less effective plasma discharge.

In accordance with the present invention, when electrodes 4a and 4b are coupled to power source 6, an electrically or plasma assisted catalytic surface is formed, which results in an unexpectedly high activity and selectivity for NOx reduction to $N_2$, with low $NO_2$ formation. As described earlier, power source 6 supplies an external AC or DC high voltage (such as from 10–30 kilovolts) across catalyst bed 2, which preferably consists of a pelletized catalyst material. Desirably, an intense electric field is formed around pellets or other elements of catalyst bed 2, resulting in a highly efficient plasma and a high energy field at the catalyst surface. In accordance with the present invention, reactive species may be generated in-situ without the use of additives using the synergy between the applied electrical fields/ plasma and the catalytic surface. In this regard, it should be noted that using the combination of applied energy and suitable materials as provided herein may result in selective NOx reduction, with low $NO_2$ formation. For example, in accordance with the present invention, using a combination of catalytic materials, such as described herein, and appropriately applied energy to the catalytic surface, treatment of diesel exhausts containing more than 15% $O_2$ resulted in the removal of more than 75% of NOx to $N_2$ (with less than 2% $NO_2$ formation). In other tests, the present invention has removed more than 80% of particulates to $CO_2$ and $H_2O$.

The present invention demonstrates the capability to selectively reduce NOx to $N_2$ and simultaneously oxidize particulates and hydrocarbons to $CO_2$ and $H_2O$, which may occur under lean conditions (relatively high $O_2$ content) and without the use of additives. In certain embodiments, the present invention may be advantageously applied to both conventional and alternate fueled on-road medium and heavy duty diesel vehicles as well as stationary and off-road engines. In accordance with the present invention, NOx removal to $N_2$, with low $NO_2$ formation and simultaneous particulate oxidation under lean conditions may be achieved, while enabling improved diesel and gasoline engine fuel efficiency such as up to at least 10–15 %.

Preferred materials in accordance with the present invention enable high NOx reduction selectively to $N_2$ with low $NO_2$ formation (e.g., less than about 10%, 5%, 2% $NO_2$, etc.) in lean exhaust conditions when the preferred materials are positioned between two electrodes, and are provided a relatively high AC or DC voltage. Such materials become highly energized when exposed to a high electric field and, in accordance with the present invention, offer an active and selective surface for NOx reduction to $N_2$, which, surprisingly, may occur despite high $O_2$ and $H_2O$ levels in the gas/pollutant stream. It should be noted that, unlike certain prior art (such as U.S. Pat. No. 5,440,876), materials useful in accordance with the present invention need not have "high" dielectric constants (such as up to $10^4$). In contrast, as illustrated in Table 2, materials utilized in accordance with the present invention may have dielectric constants that vary across a wide range (such as 3–1000, and perhaps somewhat higher), depending on the particular application, thereby enhancing the flexibility and utility of the present invention.

TABLE 2

Dielectric Constants of Representative Catalyst Materials

| Material | Dielectric Constant |
| --- | --- |
| Promoted or Unpromoted $Al_2O_3$ | 9.3–11.5 |
| Promoted or Unpromoted zeolites | 9.0–12.0 |
| Promoted or Unpromoted $CeO_2$ | 7.0 |
| Promoted or Unpromoted $ZrO_2$ | 12.5 |
| $PbZrO_3$ | 200 |
| $LaScO_3$ | 30 |

It should be noted that the dielectric constant of a material has considerable influence on the energy consumption of the system. Without being bound by theory, current flow through a dielectric material under the effect of a high electric field has two components: (1) the displacement or charging current; and (2) the burst or discharge current. Displacement current is an artifact of the material being a capacitor. The burst current is responsible for the desired plasma discharge; thus, lowering the relative amount of displacement current to burst current tends to raise the efficiency of the plasma for a fixed input energy. The relative contribution of the displacement current is a function of the dielectric constant of the material; generally, the higher the dielectric constant, the larger the displacement current. Thus, for materials such as barium titanate (having a very high dielectric constant), because the displacement current is high, this tends to results in higher power usage. In contrast, the present invention may utilize materials having a lower dielectric constant, thus reducing the displacement current and increasing the energy efficiency.

Catalytic materials that may be utilized in accordance with the present invention include promoted or unpromoted semiconducting oxides or easily reducible oxides that have the propensity to donate electrons to gaseous or adsorbed species or that have a tendency to form oxygen vacancies. Semiconducting oxides materials such as $CeO_2$, $Al_2O_3$, or zeolites and perovskite materials such as $LaFeO_{3-\delta}$ or $LaNoO_{3-\delta}$ may be preferably promoted by metals such as Cu, Co, Ni, Fe, Zr, or noble metals such as Pt, Pd, or Rh, or other metals known to those in the art. The art of promotion of catalytic surfaces with active metals is well known to those in the art and involves the dispersion of active metals on support surfaces. This dispersion of metals may be performed via commonly known methods such as incipient wetness or precipitation with a salt of the active metal or other small variations known to those in the art. In addition, these promoted or unpromoted materials also may be differently heat treated or activated by methods and in conditions known to those in the art to maintain or enhance plasma assisted catalyst activity. It should be noted that materials utilized in the present invention need not be ferroelectric as in certain conventional systems.

Figure 3:
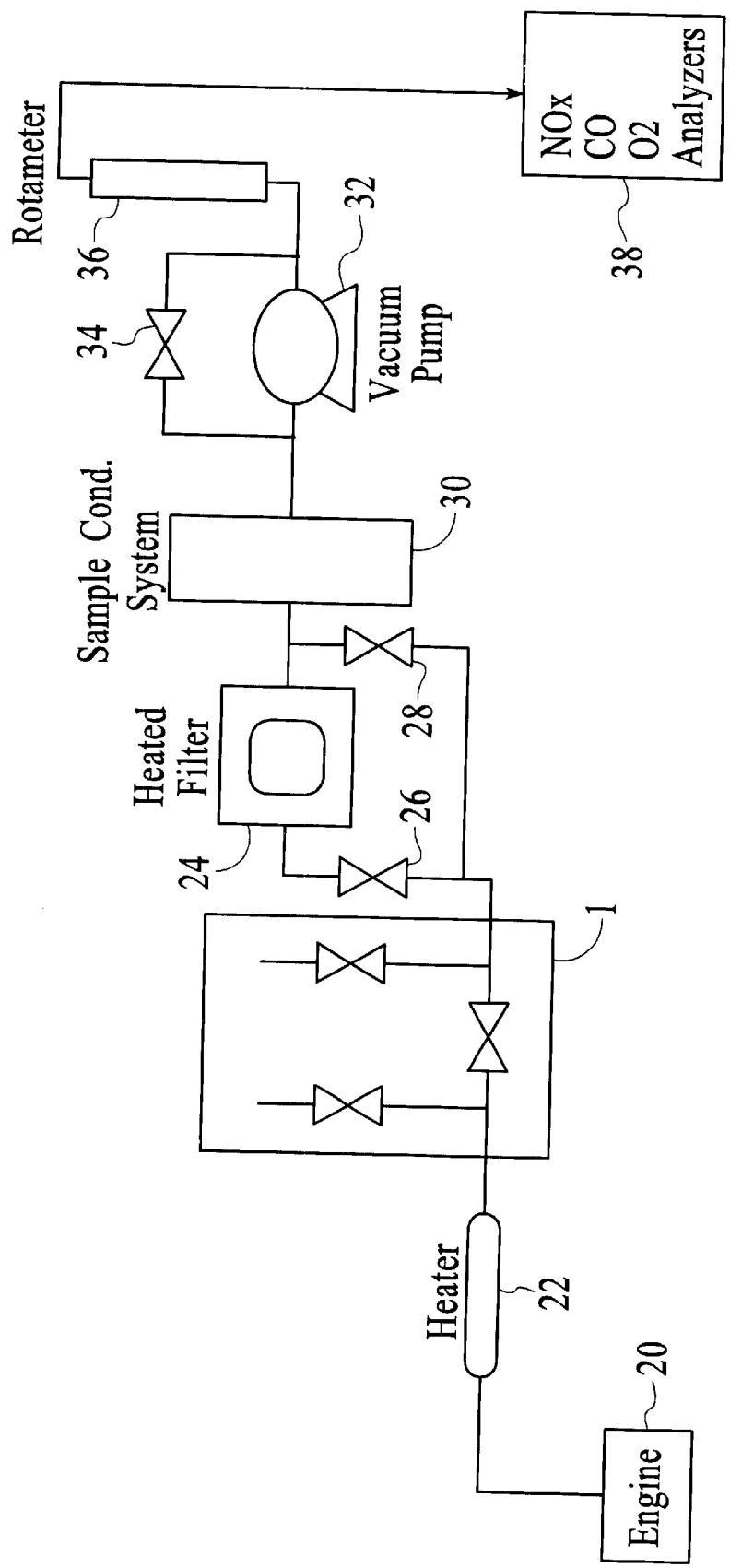
FIG. 3 is a diagram illustrating an experimental system for demonstrating embodiments of the present invention.

An embodiment of the present invention, specifically configured for observing experimental results is illustrated in FIG. 3. A slip stream from the exhaust of engine 20 (in the experiments described herein a Cummins 4 kW genset) is fed to plasma/catalyst reactor 1 via heater 22. Heater 22 may be a 20 foot heated Teflon sample line maintained at, for example, about 250° F. Optionally, and in the experiments hereinafter discussed, this is followed by 3 feet of stainless line wrapped with line heaters, which operate depending on the desired gas temperature entering the plasma bed. In general, reactor 1 should be positioned so as to reduce the exhaust temperature to the desired gas temperature entering catalyst bed 2. On contact with "plasma assisted" catalyst bed 2, NOx reduction to $N_2$ and particulate oxidation to $CO_2$ is observed. Gas exiting reactor 1 is routed through a water knockout system, as illustrated in FIG. 3, and then through a series of in-line gas analyzers that continually monitor the levels of NO/NOx, CO, $O_2$, and $CO_2$. The flow rate through the bed is measured by a calibrated rotameter 36 located downstream of pump 32 and upstream of gas analyzers 38 as illustrated in FIG. 3. It is understood that, in various other embodiments, certain components of the embodiment illustrated in FIG. 3 may be omitted.

Based on an experimental embodiment as illustrated in FIG. 3, various experiments were conducted. Gas analyzers utilized were a TECO Model 10 NO/NOx analyzer (chemiluminscence based), a TECO Model 48 CO analyzer (IR based), a Teledyne Model 320AR $O_2$ analyzer (electrochemical cell), a Horiba $CO_2$ Analyzer, a Horiba hydrocarbon analyzer, and a particulate measurement hot filter assembly. The voltage across the electrodes and the resultant current were monitored via a high voltage probe, a Model 2190 BK Precision Oscilloscope, and a Tektronix TDS380 digital oscilloscope. Baseline values for NO, NOx, and CO were obtained by bypassing the catalyst bed.

In accordance with the present invention, the use of materials that display catalytic activity for NO/NOx reduction, and the desirable activation of such materials by energy in the form of voltage applied across the catalyst, may result in selective NOx reduction to $N_2$. Without being bound by theory, the plasma essentially consists of highly energetic electrons which collide with the components of the gas generating active free radicals such as N, O, and OH. These free radicals may react with the NO according to reactions (1), (2), and (3) in the homogeneous gas phase or as surface enhanced radical reactions. In addition, the presence of hydrocarbons and carbon based particulate matter such as in typical diesel exhaust may also result in reactions (4) and (5), both in the gas phase and on the catalyst surface. The relative amount of $NO_2$ formed is likely to be a function of the competitive kinetics between reactions (2) and (3), which lead to $NO_2$ formation, and reactions (6)–(9), which lead to $NO_2$ conversion back to NO or the desired product $N_2$. It is likely that one or more reactions may occur in the gas phase or on the catalytic surface either concurrently or sequentially, the ultimate result being the selective conversion of NO to $N_2$ with low amounts of $NO_2$ exiting the reactor.

$$NO+N \rightarrow N_2+O \quad (1)$$

$$NO+O \rightarrow NO_2 \quad (2)$$

$$NO+OH \rightarrow NO_2+H \quad (3)$$

$$NO+C_xH_y \rightarrow N_2+CO_2+H_2O \quad (4)$$

$$2NO+C \rightarrow N_2+CO_2 \quad (5)$$

$$NO_2 \rightarrow NO+O \quad (6)$$

$$NO_2 \rightarrow N_2+O_2 \quad (7)$$

$$NO_2+C_xH_y \rightarrow N_2+CO_2+H_2O \quad (8)$$

$$2NO_2+2C \rightarrow N_2+2CO_2 \quad (9)$$

$C_xH_y$—formula for hydrocarbon

It is believed that the final product composition and the selectivity for NOx conversion to $N_2$ and $NO_2$ is decided by the competitive kinetics of these reactions. The use of catalyst materials in accordance with the present invention may desirably result in a synergy between the plasma and the catalyst materials used, resulting in selectivity towards $N_2$ with low $NO_2$ formation. Some of the materials also are believed to allow the surface dissociation of NO and NOx at higher temperatures augmenting NOx removal activity.

Representative materials that may be utilized for selective NO/NOx reduction in accordance with the present invention are listed in the experimental tables below, with representative data provided for each of the materials. The data generally is provided is at room temperature (about 77° F.) in a flow through an experimental embodiment as illustrated in FIG. 3.

| Experiment I. Material: Activated alumina beads ($\gamma$-alumina) | | | | |
|---|---|---|---|---|
| Engine type: Diesel | 4 kW | 4 kW | 150 kW | 150 kW |
| Length of bed (inches): | 1.0 | 1.25 | 1.4 | 1.4 |
| Flow Rate (scfh): | 9 | 10 | 6 | 6 |
| Baseline NO/NOx (ppm): | 154/155 | 153/155 | 497/510 | 569/584 |
| Baseline $O_2$: | 15.0 | 15.0 | 14.1 | 13 |
| NO/NOx Reduction (%): | 99/71 | 99/73 | 72/65 | 67/60 |
| Voltage across bed (kV): | 14.9 | 17.9 | 18.9 | 18 |
| Power Usage (Watts): | 11.8 | 16.9 | 16.0 | 16.8 |
| Power Usage (J/l): | 167.2 | 216.1 | 340.2 | 358.3 |

Considerable NO/NOx reduction is obtained under the various conditions listed above. As demonstrated by the data, in accordance with the present invention, NO may be converted to $N_2$ with low $NO_2$ formation. In addition, substantial NO/NOx reduction may be obtained while limiting engine power consumption to less than 10%, and in some cases less than 5%. In alternative embodiments, such as monolithic catalyst embodiments discussed elsewhere herein, such power consumption may be controlled/limited to about 2% of engine output power, or about 3% of engine output power, or between 3–5% of engine output power, etc.

| Experiment II. Material: Activated alumina beads ($\gamma$-alumina) | | | |
|---|---|---|---|
| Engine type: | 4 kW | 4 kW | 4 kW |
| Length of bed (inches): | 1.0 | 1.0 | 1.0 |
| Flow Rate (scfh): | 9 | 9 | 10 |
| Baseline NO/NOx (ppm): | 74/78 | 74/78 | 89/91 |
| Baseline $O_2$ (%): | 17.7 | 17.7 | 17.5 |
| NO/NOx Reduction (%): | 84/77 | 60/55 | 82/64 |
| Voltage across bed (kV): | 14.3 | 12.9 | 12.1 |
| Power Usage (Watts): | 6.1 | 2.7 | 7.8 |
| Power Usage (J/l): | 86.9 | 38.2 | 100 |

| Experiment III. Material: Activated alumina beads ($\gamma$-alumina) | | |
|---|---|---|
| Engine type: | 4 kW | 4 kW |
| Length of bed (inches): | 1.06 | 1.06 |
| Flow Rate (scfh): | 6 | 9 |
| Baseline NO/NOx (ppm): | 166/170 | 166/170 |
| Baseline $O_2$ (%): | 15.0 | 15.0 |
| NO/NOx Reduction (%): | 96/79 | 89/63 |
| Voltage across bed (kV): | 19.9 | 16.5 |
| Power Usage (Watts): | 14.9 | 10.5 |
| Power Consumption (J/l): | 316.0 | 147.9 |

| Experiment IV. Material: Pd/alumina | | | | |
|---|---|---|---|---|
| Engine type: | 4 kW | 4 kW | 4 kW | 4 kW |
| Length of bed (inches): | 1.75 | 1.75 | 1.06 | 1.06 |
| Type of packing: | beads | beads | spindles | spindles |
| Flow Rate (scfh): | 6 | 6 | 6 | 6 |
| Baseline NO/NOx (ppm): | 119/120 | 157/158 | 157/161 | 157/161 |
| Baseline $O_2$ (%): | 15.8 | 15.8 | 14.2 | 14.2 |
| NO/NOx Reduction (%): | 95/86 | 78/64 | 96/85 | 86/76 |
| Voltage across bed (kV): | 21.3 | 19.2 | 18.5 | 16.5 |
| Power Usage (Watts): | 14.3 | 15.7 | 16.4 | 10.4 |
| Power Consumption (J/l): | 302.6 | 333.4 | 348.7 | 220.4 |

| Experiment V. Material: Zirconium Oxide | | |
| --- | --- | --- |
| Engine type: | 4 kW | 4 kW |
| Length of bed (inches): | 1.06 | 1.06 |
| Flow Rate (scfh): | 9 | 9 |
| Baseline NO/NOx (ppm): | 110/117 | 110/117 |
| Baseline $O_2$ (%): | 15.2 | 15.2 |
| NO/NOx Reduction (%): | 83/59 | 65/45 |
| Voltage across bed (kV): | 18.7 | 15.3 |
| Power Usage (Watts): | 17.9 | 12.7 |
| Power Usage (J/l): | 253.7 | 179.4 |

| Experiment VI. Material: Cobalt substituted ZSM5 zeolite cylinders | | |
| --- | --- | --- |
| Engine type: | 4 kW | 4 kW |
| Length of bed (inches): | 1.75 | 1.75 |
| Flow Rate (scfh): | 6 | 10 |
| Baseline NO/NOx (ppm): | 116/119 | 117/119 |
| Baseline $O_2$ (%): | 16.8 | 16.8 |
| NO/NOx Reduction (%): | 70/47 | 49/40 |
| Voltage across bed (kV): | 22.4 | 23.4 |
| Power Usage (Watts): | 14.4 | 15.4 |
| Power Consumption (J/l): | 305.3 | 196.5 |

Other materials such as a cobalt promoted and a copper promoted alumina-silica-sodium oxide also were found to be desirably active with plasma assistance in accordance with the present invention, with NOx reduction to $N_2$ over 75% and 55% respectively. Other materials that are expected to be desirably active include the following: alumina promoted by alkali, alkaline earth or metals such as nickel, iron, or noble metals such as platinum, palladium, and rhodium; various zeolites containing cobalt, iron, or copper; mixed oxides such as $PbZrO_3$; and perovskites such as $LaFeO_{3-\delta}$ or $LaNiO_{3-\delta}$.

In still other embodiments, desirable materials for selective NO/NOx reduction are combined with desirable materials for particulate oxidation a dual bed arrangement to obtain simultaneous NOx reduction and desirable particulate oxidation. In yet other embodiments, catalytic materials utilized in accordance with the present invention display high catalytic activity resulting in selective NOx reduction at higher temperatures while also having a negative coefficient of resistance (such as about 200–1000° F.). The negative coefficient of resistance implies that as the temperature increases, the resistance of the bed decreases. This decreased resistance will allow a high current draw and subsequently higher power as temperature increases. For a fixed bed length, since the power requirement to achieve a certain performance is fixed, this may serve to decrease the input power consumption to the plasma reactor. Such materials having a negative coefficient of resistance will allow operation at high temperatures with reduced power consumption.

Figure 4A:
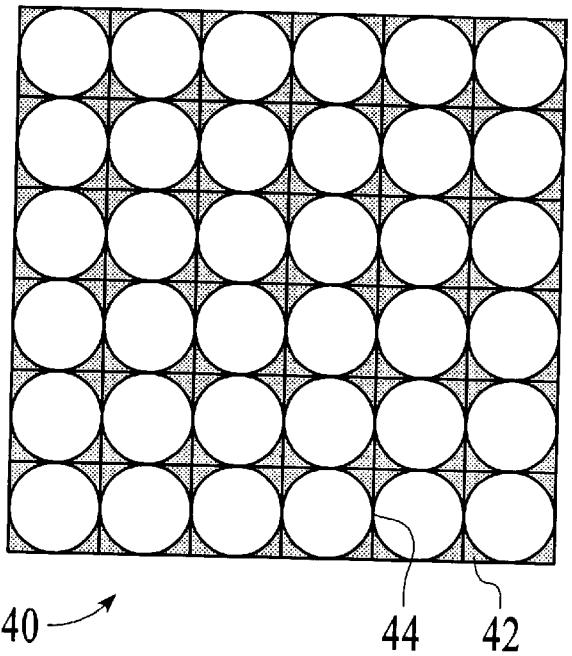
FIGS. 4A and 4B illustrate embodiments of monolithic-type catalysts that may be utilized in accordance with certain preferred embodiments of the present invention.
Figure 4B:
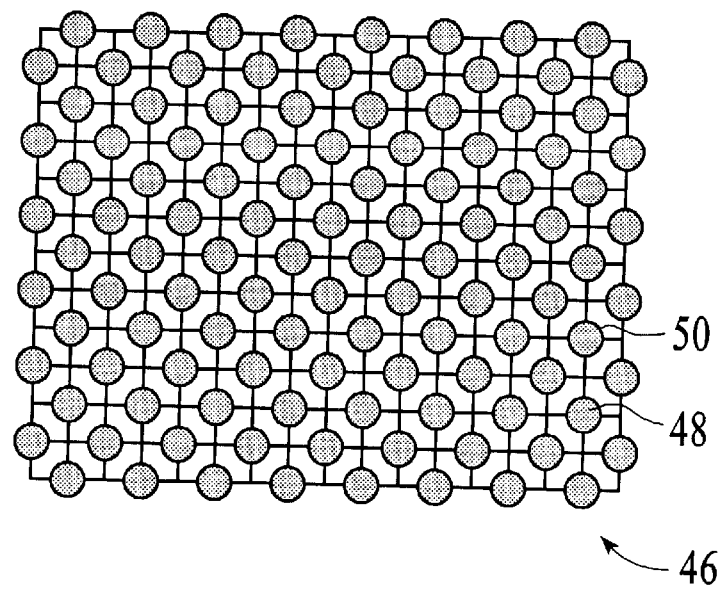

In other preferred embodiments, catalyst bed 2 is implemented not in the form of spheres, but instead in a monolithic or other similar form and the plasma is generated in the channels of the monolith. FIGS. 4A and 4B illustrate two such embodiments. FIG. 4A illustrates monolithic catalyst 40, which is preferably formed by extruding a base (substrate) material through a metallic die. The embodiment of FIG. 4A includes a number of cells 42, which may vary in density from about 50 cells/$in^2$ to about 400 cells/$in^2$. In other embodiments, each alternate cell is blocked off and the walls of the cells are porous, with the gas flow through the porous wall into adjoining cells and ultimately out of the monolith. In such embodiments, solid mass may be retained within the porous materials, acting as a filter. Cell walls 44 provide the desired catalytic surfaces for the NO/NOx reduction reactions of the present invention. In still other embodiments, such as illustrated in FIG. 4B, monolithic catalyst 46 is formed (such as by extrusion) to provide convex rather than concave curved surfaces, which may serve to enhance the effectiveness of the plasma-assisted reactions of the present invention. As illustrated, catalyst 46 provides cells 48 providing convex surfaces 50, consisting of a desired catalytic material.

Substrate material for catalysts such as monolithic catalysts 40 and 46 may consist of, for example, $2MgO.2Al_2O_3.5SiO_2$. Depending on the substrate, the material may need to be washcoated or the like, by methods known in the art, with one or more active metals or oxides to provide desired active catalytic surfaces. Artisans skilled in the catalyst formation art may select such materials, structures and manufacturing processes, such as extrusion, washcoating, etc., to produce desirable catalytic materials/structures that may result in NO/NOx reduction with plasma assist in accordance with the present invention.

Figure 5:
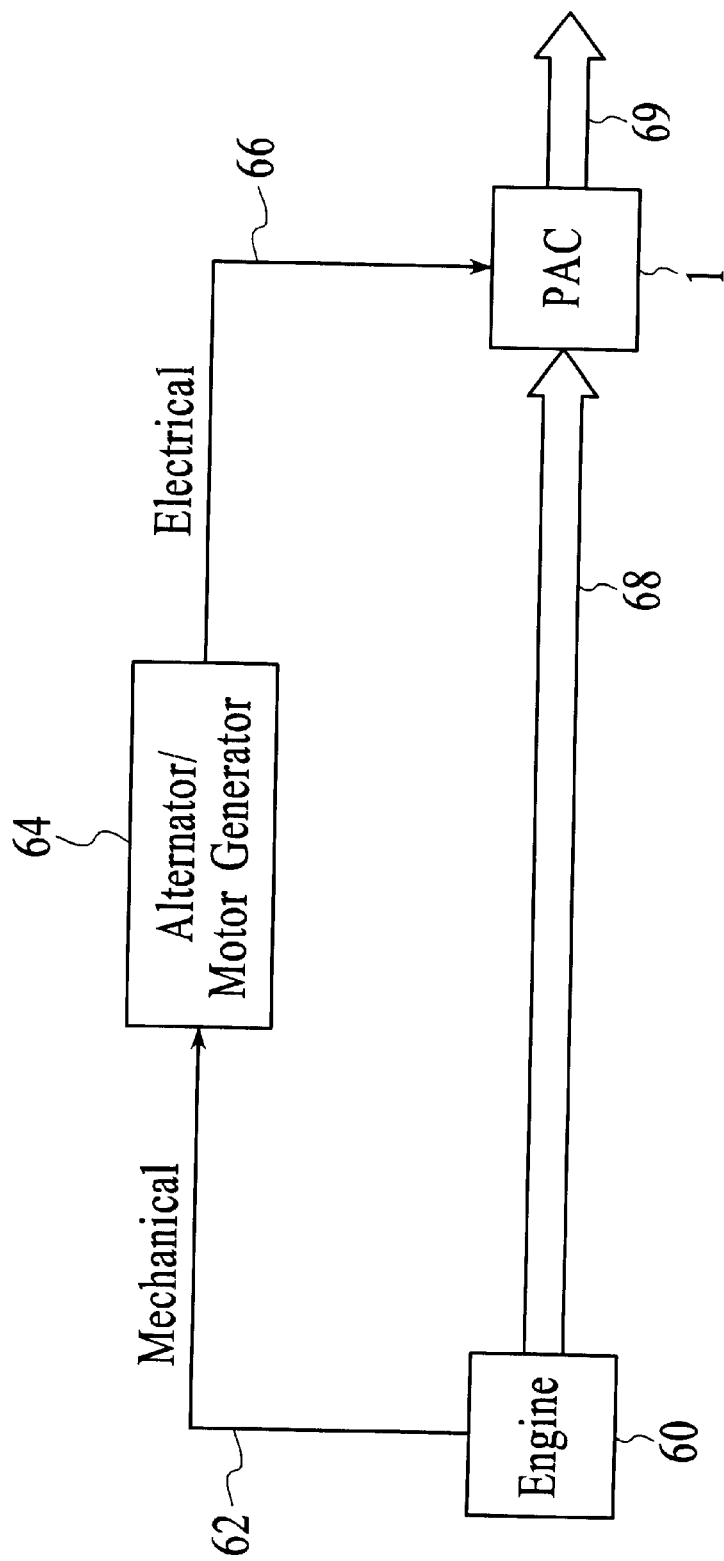
FIG. 5 is a diagram of an illustrative embodiment of the present invention applied to an internal combustion engine.

FIG. 5 illustrates a particular preferred embodiment of the present invention applied to an internal combustion engine. Engine 60 is coupled mechanically to alternator, or motor generator, 64 via mechanical coupler 62, which may be a conventional belt, shaft, etc. What is important is that mechanical energy from engine 60 is coupled to an alternator, or motor generator, 64, which is used to generate electrical energy output 66. Electrical energy output 66 is coupled to "PAC" (plasma assisted catalyst) reactor 1 (e.g., to power supply 6 of FIGS. 1A–1C), which is used to reduce NO/NOx from engine 60, coupled by conduit 68, resulting in NO/NOx-reduced output 69. Catalyst within reactor 1 may consist of materials as previously described herein, and in preferred embodiments consists of monolithic type catalysts, with reactor 1 configured in a tubular-type form, such as in a conventional muffler. Use of such monolithic-type catalysts in a muffler-type configuration may desirably result in better performance and durability. For example, catalyst spheres may lack uniformity depending upon the packing, and, in mobile applications, may move, rub and abrade, thereby resulting in sphere/pellet attrition, channel flow (resulting in under-treated gas), etc.

As will be apparent, while FIG. 5 illustrates engine 60, the present invention could be applied to other industrial processes generated gases containing NOx, with mechanical or other energy from the process (or externally generated) used to generate electrical energy, which is in turn applied to electrodes in accordance with the present invention. The energy output of the industrial process could be used, for example, to generate electricity such as by mechanical coupling to a genset, process chemicals or other materials, conduct physical movement such as by mechanical coupling to a transmission, etc.

Based on experiments in accordance with the present invention, systems may be constructed to substantially reduce NO/NOx, resulting in engine power consumption for the plasma-assisted reaction of within about 2–5% of engine output power, or alternatively less than 5%, 7%, or 10% of engine output power, still resulting in output NOx of about 2 g/bhp-hr (or about 2–4 g/bhp-hr), and particulates of about 0.05 g/bhp-hr (or about 0.05–0.1 g/bhp-hr). The ability to provide such reductions while minimizing power consumption presents unexpected and desirable improvements over conventional techniques.

As will be appreciated by those skilled in the art, the foregoing embodiments provide refinements, improvements and advances over the art, resulting in desirable reduction with reasonable power consumption, while enabling a system that may be desirably applied, for example, to either stationary or mobile internal combustion engines.

In accordance with the present invention, a variety of materials that, in the presence of a suitable electric field, may be surprisingly (and highly) selective for NO/NOx reduction to $N_2$, with low $NO_2$ formation in a catalyst bed, plasma configuration, across a broad temperature range. Such materials may include the following: (1) alumina and/or silica as such or promoted by alkali, alkaline earth or metals such as nickel, copper, cobalt, platinum, palladium, or rhodium; (2) various zeolites containing cobalt, iron, or copper; (3) vanadia or titania as such or promoted by metals such as nickel or cobalt; or (4) mixed oxides such as $PbZrO_3$; and perovskites such as $LaFeO_{3-\delta}$ or $LaNiO_{3-\delta}$.

In contrast to conventional thinking, the dielectric constant of these materials need not and desirably should not be extremely high; the dielectric constant may vary across a substantial range depending on the desired material (e.g., such as catalytic properties, ability to form in a monolithic manner, etc.). Catalytic materials encompassing semiconducting oxides or easily reducible oxides with a propensity to donate electrons to gaseous or adsorbed species or with a tendency to form oxygen vacancies may be particularly suitable for the present invention. Semiconducting oxides such as $CeO_2$ or $Al_2O_3$ as well as perovskite materials such as $LaFeO_{3-\delta}$ or $LaNiO_{3-\delta}$ may be suitable for selective NOx reduction. Such materials need not be ferroelectric, as in certain conventional techniques, and the materials need not necessarily contain noble metals for catalytic activity, although the materials may have a low work function (energy required to expel an electron from the outermost orbit), though this is not a necessary criteria for catalytic activity.

Catalytic materials in accordance with the present invention may be combined with materials having the desired oxidation activity and low work function in a dual bed arrangement, which may provide a dual function configuration. This may provide simultaneous and selective reduction of NOx to $N_2$ and also oxidation of particulates to $CO_2$.

Additionally, in accordance with the present invention the use of a NOx reducing material having a negative coefficient of resistance may be utilized for reduced power usage at higher temperatures. This is believed to allow the operation of the plasma reactor at a range of desired temperatures by adjusting the energy input and the amount of material packed/positioned between the electrodes.

In accordance with the present invention, selective reduction of NOx to $N_2$ may be achieved even if the presence of $O_2$ (e.g., 2–18%) and/or $H_2O$ (e.g., 0–10%), in general with minimal power consumption and without supplemental additives. High dielectric constant and/or ferroelectric properties of the catalytic material are not required with preferred embodiments of the present invention. In embodiments utilizing, for example, an internal combustion engine, the present invention may achieve selective NOx reduction even at or below engine exhaust temperature (e.g., 800–1000 degree F). Additionally, the present invention may enable selective NOx reduction using low current density and a plasma more uniformly distributed within the reactor.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A continual flow process method for removing NOx from an exhaust gas stream produced by an internal combustion engine, comprising the steps of:

generating the exhaust gas stream with the internal combustion engine, wherein the exhaust gas stream contain NOx and $O_2$, wherein the internal combustion engine produces power of a first level, wherein the NOx contains $NO_2$ and NO;

continually flowing the exhaust gas stream around one or more catalytic surfaces positioned between first and second electrodes, wherein the catalytic surfaces are formed of a material having a dielectric constant; and continually applying a varying electrical potential between the first and second electrodes, wherein the electrical potential and the one or more catalytic surfaces, in the presence of hydrocarbons, result in the generation of a non-thermal plasma and displacement current that consumes eletrical power, wherein $NO_2$ is formed from NO in the exhaust gas stream and the $NO_2$ is selectively reduced to $N_2$, wherein dielectric constant of the material results in displacement current at a level wherein application of the continually applied varying electrical potential consumes power at a second level, wherein the second level is less than 10% of the first level.

2. The method of claim 1, wherein the $O_2$ is present in the gas stream in a concentration in the range of about 2–18 volume %.

3. The method of claim 1, wherein the one or more catalytic surfaces comprise a material selected from the group consisting of activated alumina, palladium/alumina, zirconium oxide, cobalt promoted alumina-silica-sodium oxide, copper promoted alumina-silica-sodium oxide, alumina promoted by alkali, alkaline earth metals, nickel, iron, platinum, palladium or rhodium, various zeolites containing or promoted by cobalt, iron, or copper, mixed oxides, and perovskites.

4. The method of claim 1, wherein the first and second electrodes are arranged transverse to the direction of flow of the gas stream or are arranged in an annular arrangement, wherein the gas stream flows between the first and second electrodes.

5. The method of claim 1, wherein the varying electrical potential is applied in the form of pulses, wherein the pulses have a frequency/repetition rate in the range of about 60 Hz to 30,000 Hz.

6. The method claim 5, wherein the pulses have a rise time in the range of about $10^{-3}$ seconds to $10^{-6}$ seconds or in the range of about $10^{-3}$ seconds to $10^{-10}$ seconds.

7. The method of claim 1, wherein the catalytic surfaces comprise a plurality of spheres, a monolithic catalyst material, or a catalyst disposed on a substrate.

8. The method of claim 1, wherein the catalytic surfaces are arranged in a plurality of cells, wherein the cells have porous walls, wherein at least a portion of the gas stream flows through the cell walls, wherein solid mass in the gas stream is trapped in the cell walls.

9. The method of claim 1, wherein the second level is less than 5% of the first level or less than 3% of the first level.

10. The method of claim 1, further comprising the step of reacting $NO_2$ in the exhaust gas with hydrocarbons to reduce it to $N_2$.

11. The method of claim 1, wherein hydrocarbons are present in the exhaust gas stream, wherein $NO_2$ in the exhaust gas stream is reduced to $N_2$ at least in part by the reaction $NO_2 + C_xH_y \rightarrow N_2 + CO_2 + H_2O$.

12. A continual flow process method for removing NOx from a gas stream also containing $O_2$, wherein the NOx contains $NO_2$ and NO, comprising the steps of:

continually flowing the gas stream around one or more curved catalytic surfaces positioned between first and second electrodes; and continually applying a varying electrical potential between the first and second electrodes;

wherein the electrical potential and the one or more curved catalytic surfaces result in the generation of a non-thermal plasma, wherein, in the presence of hydrocarbons, NO in the gas stream is converted to NO2, wherein the NO2 is selectively reduced to $N_2$.

13. The method of claim 12, wherein $NO_2$ in the gas stream is reduced to $N_2$ at least in part by the reaction $NO_2 + C_xH_y \rightarrow N_2 + CO_2 \, H_2O$.

14. The method of claim 12, wherein the $O_2$ is present in the gas stream in a concentration in the range of about 2–18 volume %.

15. The method of claim 12, wherein the one or more catalytic surfaces comprise a material selected from the group consisting of activated alumina, palladium/alumina, zirconium oxide, cobalt promoted alumina-silica-sodium oxide, copper promoted alumina-silica-sodium oxide, alumina promoted by alkali, alkakine earth metals, nickel, iron, platinum, palladium or rhodium, various zeolites containing or promoted by cobalt, iron, or copper, mixed oxides, and perovskites.

16. The method of claim 12, wherein the first and second electrodes are arranged transverse to the direction of flow of the gas stream or are arranged in an annular arrangement, wherein the gas stream flows between the first and second electrodes.

17. The method claim 12, wherein the varying electrical potential is applied in the form of pulses, wherein the pulses have a frequency/repetition rate in the range of about 60 Hz to 30,000 Hz.

18. The method of claim 17, wherein the pulses have a rise time in the range of about $10^{-3}$ seconds to $10^{-6}$ seconds or in the range of about $10^{-10}$ seconds.

19. The method of claim 12, wherein the catalytic surfaces comprise a plurality of spheres. a monolithic catalyst material, or a catalyst disposed on a substrate.

20. The method of claim 12, wherein the catalytic surfaces are arranged in a plurality of cells, wherein the cells have porous walls, wherein at least a portion of the gas stream flows through the cell walls, wherein solid mass in the gas stream is trapped in the cell walls.

21. The method of claim 12, wherein the gas stream is produced by an internal combustion engine, wherein the internal combustion engine produces power of a first level, wherein the catalytic surfaces are formed of a material having a dielectric constant, wherein the application of the varying electrical potential results in displacement current that consumes electrical power, wherein the dielectric constant of the material results in displacement current at a level wherein application of the varying electrical potential consumes power at a second level, wherein the second level is less than 10% of the first level or less than 5% of the first level or less than 3% of the first level.

* * * * *